(12) United States Patent
Kato et al.

(10) Patent No.: US 11,293,771 B2
(45) Date of Patent: Apr. 5, 2022

(54) DISPLAY DEVICE, DISPLAY METHOD AND CONTROL DEVICE

(71) Applicant: Panasonic Intellectual Property Management Co., Ltd., Osaka (JP)

(72) Inventors: Hiroshi Kato, Tokyo (JP); Takuma Iida, Kanagawa (JP); Akihiro Sawa, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 85 days.

(21) Appl. No.: 16/658,005

(22) Filed: Oct. 18, 2019

(65) Prior Publication Data

US 2020/0049523 A1 Feb. 13, 2020

Related U.S. Application Data

(63) Continuation of application No. PCT/JP2018/024992, filed on Jul. 2, 2018.

(30) Foreign Application Priority Data

Jul. 6, 2017 (JP) .............................. JP2017-132861

(51) Int. Cl.
*G01C 21/34* (2006.01)
*G08G 1/0969* (2006.01)
*G08G 1/0968* (2006.01)

(52) U.S. Cl.
CPC ..... *G01C 21/3469* (2013.01); *G01C 21/3492* (2013.01); *G08G 1/0969* (2013.01); *G08G 1/096844* (2013.01); *B60L 2260/52* (2013.01)

(58) Field of Classification Search
CPC ............ G01C 21/3469; G01C 21/3492; G01C 21/3679; G01C 21/3697; G01C 21/3423;
(Continued)

(56) References Cited

U.S. PATENT DOCUMENTS

2011/0099100 A1* 4/2011 Onishi ............... G01C 21/3469
705/37
2013/0006530 A1* 1/2013 Nishiuma .......... G01C 21/3469
701/533
(Continued)

FOREIGN PATENT DOCUMENTS

JP 2003-233656 A 8/2003
JP 2005-182146 7/2005
(Continued)

OTHER PUBLICATIONS

International Search Report of PCT application No. PCT/JP2018/024992 dated Sep. 11, 2018.
(Continued)

*Primary Examiner* — Khoi H Tran
*Assistant Examiner* — Shahzab Hussain Shah
(74) *Attorney, Agent, or Firm* — Seed IP Law Group LLP (57) ABSTRACT

A display device includes an emission level calculator and a display. On the basis of a first route for a vehicle from an origin to a destination and electricity information of electricity stored in an in-vehicle battery in which electricity to be used for travel of the vehicle is stored, the emission level calculator calculates a first emission level of carbon dioxide to be caused by travel of the vehicle on the first route. Furthermore, on the basis of a second route for public transportation from the origin to the destination, the emission level calculator calculates a second emission level of carbon dioxide to be caused by travel of the public transportation on the second route. The display displays information based on the first emission level and the second emission level.

14 Claims, 6 Drawing Sheets

(58) Field of Classification Search
CPC ............ G08G 1/096844; G08G 1/0969; B60L 2260/52; G09B 29/10
See application file for complete search history.

(56) References Cited

U.S. PATENT DOCUMENTS

| | | | |
|---|---|---|---|
| 2013/0261953 A1 | 10/2013 | Kiyama et al. | |
| 2014/0188775 A1* | 7/2014 | Lehmann | G01C 21/3438 706/46 |
| 2014/0214321 A1 | 7/2014 | Kawamata et al. | |
| 2015/0306969 A1* | 10/2015 | Sabripour | G06Q 10/02 320/109 |
| 2016/0153796 A1* | 6/2016 | Stankoulov | B60W 40/1005 701/123 |
| 2017/0101025 A1* | 4/2017 | Penilla | B60L 53/60 |
| 2017/0138758 A1* | 5/2017 | Ricci | B60L 53/53 |
| 2017/0262790 A1* | 9/2017 | Khasis | G08G 1/0116 |
| 2017/0357916 A1* | 12/2017 | Shelby | G01C 21/3697 |
| 2018/0170349 A1* | 6/2018 | Jobson | B60W 20/40 |

FOREIGN PATENT DOCUMENTS

| | | | | |
|---|---|---|---|---|
| JP | 2009079995 A | * | 4/2009 | ............ B60W 40/12 |
| JP | 2011-133429 | | 7/2011 | |
| JP | 5067383 B2 | * | 11/2012 | |
| JP | 2013-025432 | | 2/2013 | |
| JP | 2013-159139 A | | 8/2013 | |
| JP | 2013-210281 A | | 10/2013 | |
| JP | 5336811 B | | 11/2013 | |
| JP | 2014-073002 A | | 4/2014 | |
| JP | 5855212 B1 | | 2/2016 | |
| WO | 2013/024521 A1 | | 2/2013 | |

OTHER PUBLICATIONS

Japanese Office Action dated Nov. 30, 2021 for the related Japanese Patent Application No. 2017-132861 (with English translation).

* cited by examiner

| | Personal movable-body apparatus | | | | | | Rideshare (number of persons on board: n) | | | | | | Taxi | | | | | | Carshare | | | | | | Train | | | | | |
|---|---|---|---|---|---|---|---|---|---|---|---|---|---|---|---|---|---|---|---|---|---|---|---|---|---|---|---|---|---|---|
| | A | B | C | | D | E | A | B | C | | D | E | A | B | C | | D | E | A | B | C | | D | E | A | B | C | | D | E |
| | | | C1 | C2 | | | | | C1 | C2 | | | | | C1 | C2 | | | | | C1 | C2 | | | | | C1 | C2 | | |
| S.S.V. | 150 | 100 | 50 | 0 | 100 | 20 | 150/n | 100/n | 50/n | 0 | 100/n | 20/n | 75 | 50 | 25 | 0 | 80 | 10 | 120 | 80 | 40 | 0 | 80 | 15 | | | | | | |
| F.S.V. | | | | | | | | | | | | | | | | | | | | | | | | | | | | | | |
| T.W.V. | | | | | | | | | | | | | | | | | | | | | | | | | | | | | | |
| Train | | | | | | | | | | | | | | | | | | | | | | | | | | 100/n | 50/n | 0 | 100/n | 20/n |
| Bicycle | | | | | | | | | | | | | | | | | | | | | | | | | | | | | | |
| On foot | | | | | | | | | | | | | | | | | | | | | | | | | | | | | | |
| Airplane | | | | | | | | | | | | | | | | | | | | | | | | | | | | | | |
| Ship | | | | | | | | | | | | | | | | | | | | | | | | | | | | | | |

S.S.V.: Standard-size vehicle
F.S.V.: Full-size vehicle
T.W.V.: Two-wheeled vehicle A: Gasoline vehicle
B: Hybrid vehicle
C: Electric vehicle
  C1: Derived from thermal energy
  C2: Derived from renewable energy
D: Solar cell-mounted vehicle
E: Fuel cell vehicle

DISPLAY DEVICE, DISPLAY METHOD AND CONTROL DEVICE

CROSS-REFERENCE TO RELATED APPLICATIONS

This application is a continuation of the PCT International Application No. PCT/JP2018/024992 filed on Jul. 2, 2018, which claims the benefit of foreign priority of Japanese patent application No. 2017-132861 filed on Jul. 6, 2017, the contents all of which are incorporated herein by reference.

BACKGROUND

1. Technical Field

The present disclosure relates to a display device and a display method by which information about traffic is displayed and also relates to a control device.

2. Description of the Related Art

Conventionally, an in-vehicle device which encourages use of public transportation in order to reduce environmental burden to be caused by carbon dioxide emission, etc., is known (for example, refer to Japanese Unexamined Patent Publication No. 2011-133429 (hereinafter referred as PTL 1). In this technique, the use of public transportation is encouraged on the premise that the level of carbon dioxide emission of public transportation is lower than the level of carbon dioxide emission of private vehicles, etc. Specifically, the use of public transportation is encouraged when time required from a departure point or an origin to a destination point is shorter in the case of using public transportation than in the case of using a vehicle or when travel time or distance on foot through public transportation is shorter than a predetermined value.

SUMMARY

A display device according to the present disclosure includes an emission level calculator and a display. On the basis of a first route for a vehicle from an origin to a destination and electricity information of electricity stored in an in-vehicle battery in which electricity to be used for travel of the vehicle is stored, the emission level calculator calculates a first emission level of carbon dioxide to be caused by travel of the vehicle on the first route. Furthermore, on the basis of a second route for public transportation from the origin to the destination, the emission level calculator calculates a second emission level of carbon dioxide to be caused by travel of the public transportation on the second route. The display displays information based on the first emission level and the second emission level.

In a display method according to the present disclosure, on the basis of a first route for a vehicle from an origin to a destination and electricity information of electricity stored in an in-vehicle battery in which electricity to be used for travel of the vehicle is stored, a first emission level of carbon dioxide to be caused by travel of the vehicle on the first route is calculated. Furthermore, on the basis of a second route for public transportation from the origin to the destination, a second emission level of carbon dioxide to be caused by travel of the public transportation on the second route is calculated. Subsequently, information based on the first emission level and the second emission level is displayed.

A control device according to the present disclosure includes an emission level calculator and a controller. On the basis of a first route for a vehicle from an origin to a destination and electricity information of electricity stored in an in-vehicle battery in which electricity to be used for travel of the vehicle is stored, the emission level calculator calculates a first emission level of carbon dioxide to be caused by travel of the vehicle on the first route. Furthermore, on the basis of a second route for public transportation from the origin to the destination, the emission level calculator calculates a second emission level of carbon dioxide to be caused by travel of the public transportation on the second route. The controller compares the first emission level and the second emission level.

According to the present disclosure, a user can be prompted to curb the on-road carbon dioxide emission.

DETAILED DESCRIPTION OF PREFERRED EMBODIMENTS

It is expected that along with introduction of renewable energy, the level of carbon dioxide that is emitted in a period between generation and supply of energy will be reduced. Furthermore, along with development of automation, the level of carbon dioxide that is emitted during movement is expected to be reduced. Moreover, along with widespread use of rideshare, the level of carbon dioxide that is emitted upon movement per person is expected to be reduced.

This means that there is a possibility that the level of carbon dioxide that is emitted upon movement of an individual movable-body apparatus such as a private vehicle may become lower than the level of carbon dioxide emission of public transportation. Therefore, in a technique such as that disclosed in PTL 1 based on the premise that the level of carbon dioxide emission of public transportation is lower than the level of carbon dioxide emission of private vehicles, etc., there is a certain limit to suppressing carbon dioxide emission.

The present disclosure provides a display device and a display method by which a user can be prompted to suppress on-road carbon dioxide emission.

Figure 1:
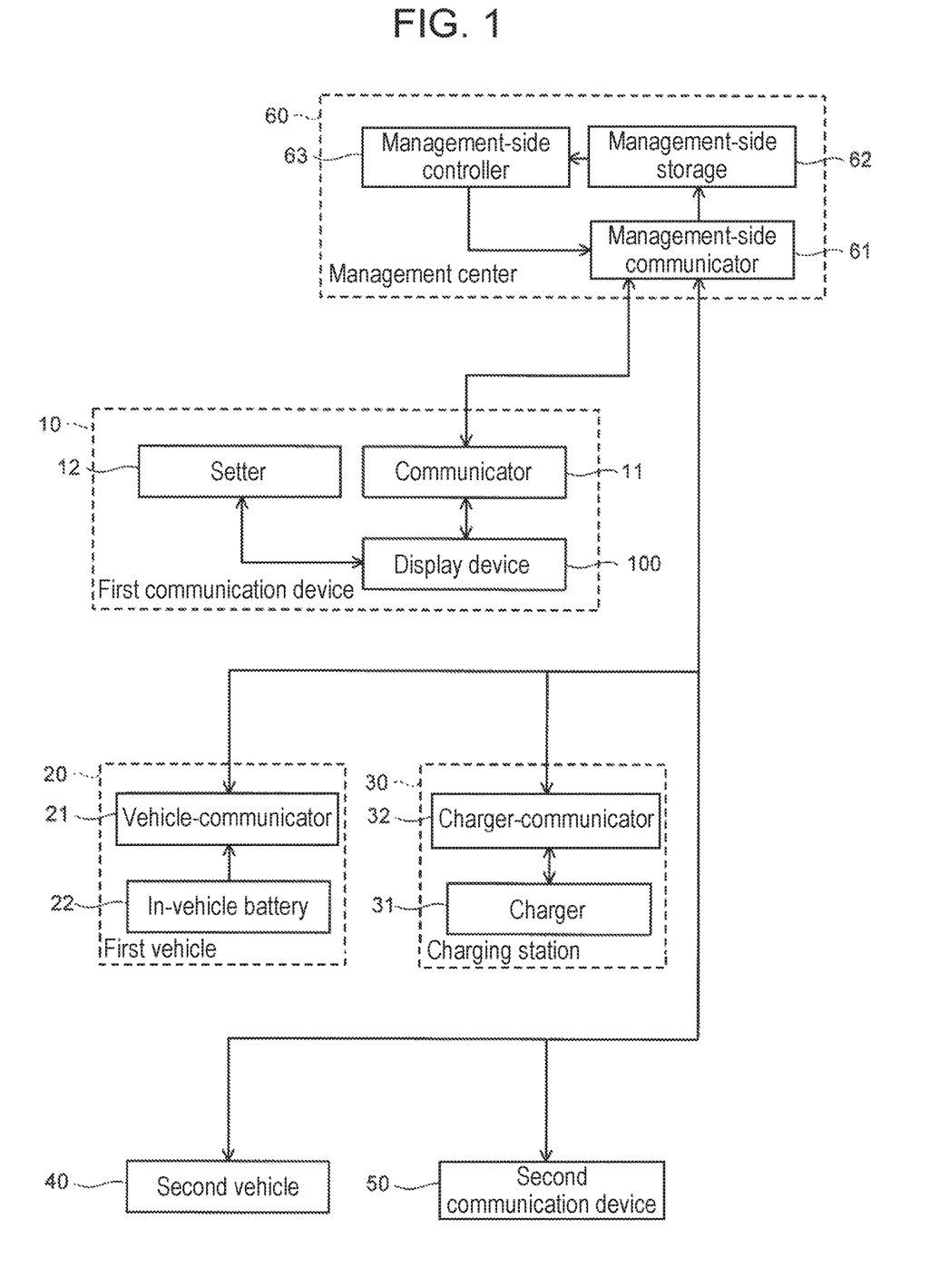
FIG. 1 is a function block diagram illustrating a charging system including a display device according to an exemplary embodiment of the present disclosure.

Hereinafter, an exemplary embodiment of the present disclosure will be described in detail with reference to the drawings. FIG. 1 is a block diagram illustrating a charging system including display device 100 according to the present embodiment. First vehicle 20 corresponds to a "vehicle" in the present disclosure. As illustrated in FIG. 1, the charging system includes first communication device 10, first vehicle 20, charging station 30, second vehicle 40, second communication device 50, and management center 60.

First communication device 10 is, for example, a portable communication terminal such as a smartphone, and includes communicator 11, setter 12, and display device 100. Communicator 11 transmits and receives predetermined information to and from management center 60. Setter 12 sets a destination to which a user is moving and sets whether or not to use rideshare which is sharing of a vehicle journey, for example.

For example, in the case where a user of first communication device 10 is riding in other's vehicle and heading for a destination, communicator 11 transmits, to management center 60, rideshare information indicating a wish to use rideshare. For example, rideshare information of second vehicle 40 owned by another person different from the user is stored in management center 60, and when there is a match between conditions such as the destinations in the rideshare information, it becomes possible that the other person gives the user a ride in second vehicle 40.

Furthermore, in the case where the user is giving a ride in first vehicle 20 to another person heading for the same destination, communicator 11 transmits rideshare information to management center 60 directly or via vehicle-communicator 21 of first vehicle 20. Here, for example, when rideshare information of second communication device 50 owned by another person different from the user is stored in management center 60, it becomes possible that the user gives the other person a ride in first vehicle 20.

Display device 100 acquires predetermined information received by communicator 11 and destination information set by setter 12, and displays information about traffic to the user. Specifically, on the basis of the carbon dioxide emission level of a movable-body apparatus used in the movement of the user from the current location to the destination, display device 100 performs indication to prompt the user to curb or suppress on-road carbon dioxide emission.

Display device 100 will be described later in detail.

First vehicle 20 is a vehicle such as an electric vehicle owned by a user of first communication device 10, and includes first vehicle-communicator 21 and in-vehicle battery 22. Vehicle-communicator 21 transmits electricity information of electricity to communicator 11 of first communication device 10 via management center 60. In-vehicle battery 22 stores the electricity to be used for travel of first vehicle 20. Note that the electricity information in in-vehicle battery 22 may be transmitted directly from vehicle-communicator 21 to communicator 11 of first communication device 10.

The electricity information includes information of the amount of electricity stored in in-vehicle battery 22 and information about the type of an energy source that has generated the electricity stored in in-vehicle battery 22. Examples of the energy source include an energy source derived from thermal energy and an energy source derived from renewable energy.

Furthermore, in response to a user operation, vehicle-communicator 21 of first vehicle 20 transmits, to management center 60, charging reservation information indicating that charging station 30 in a predetermined position is to be reserved for charging in-vehicle battery 22. Thus, charging station 30 is quickly reserved via management center 60.

Charging station 30 is one of charging points for electric vehicles. The charging points are installed in districts. Charging station 30 includes charger-communicator 32 and charger 31 for charging in-vehicle battery 22 of an electric vehicle such as first vehicle 20. Charger-communicator 32 receives the charging reservation information from management center 60. Subsequently, on the basis of the charging reservation information, charger 31 at charging station 30 is reserved.

Second vehicle 40 is owned by another person different from the user. Second communication device 50 is owned by another person different from the user. Second vehicle 40 and second communication device 50 are capable of communicating with management center 60 and, for example, are capable of transmitting and receiving rideshare information of another person, for example.

Management center 60 collects and manages information from first communication device 10, first vehicle 20, charging station 30, second vehicle 40, and second communication device 50. Management center 60 includes management-side communicator 61, management-side storage 62, and management-side controller 63.

When receiving rideshare information from any of first communication device 10, first vehicle 20, second vehicle 40, and second communication device 50, management-side communicator 61 causes management-side storage 62 to store the rideshare information. When more than one piece of rideshare information is stored in management-side storage 62, management-side controller 63 compares each piece of the rideshare information with other piece of rideshare information and selects a pair of pieces of rideshare information that include matching conditions such as destinations.

Management-side controller 63 causes management-side communicator 61 to transmit a piece of rideshare information including the matched condition to the communication device which has transmitted the rideshare information.

Management-side communicator 61 receives the charging reservation information from first vehicle 20 and causes management-side storage 62 to store the charging reservation information. Management-side controller 63 causes management-side communicator 61 to transmit the charging reservation information to corresponding one of charging stations 30.

Figure 2:
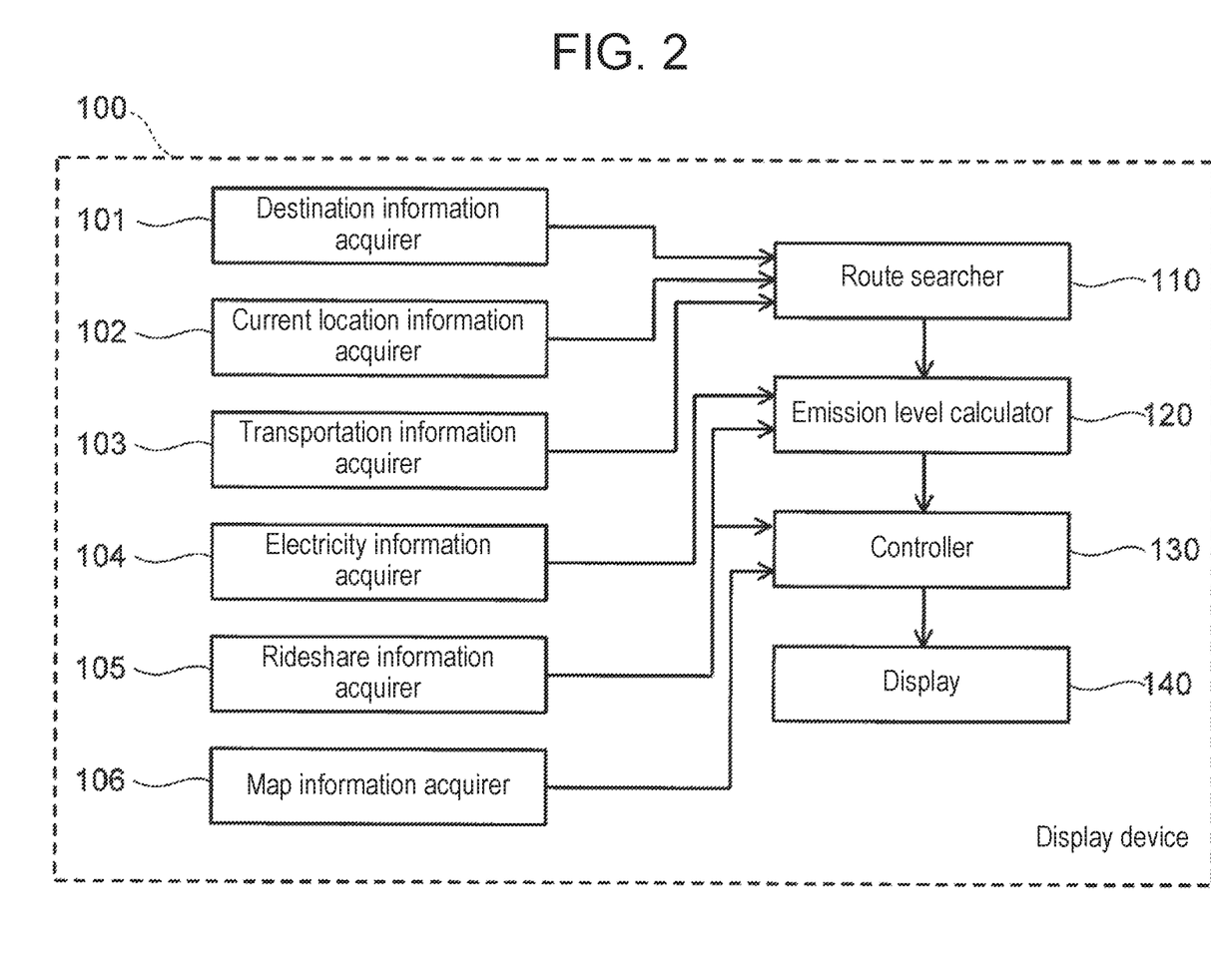
FIG. 2 is a function block diagram of the display device illustrated in FIG. 1.

Next, display device 100 will be described in detail. FIG. 2 is a block diagram illustrating display device 100. As illustrated in FIG. 2, display device 100 includes destination information acquirer 101, current location information acquirer 102, transportation information acquirer 103, electricity information acquirer 104, rideshare information acquirer 105, map information acquirer 106, route searcher 110, emission level calculator 120, controller 130, and display 140.

Destination information acquirer 101 acquires destination information set by setter 12 of first communication device 10, and outputs the destination information to route searcher 110.

For example, current location information acquirer 102 acquires, from a global positioning system (GPS) or the like, current location information indicating a position in which the user is currently located, and outputs the current location information to route searcher 110.

For example, transportation information acquirer 103 acquires public transportation information previously stored in a storage (not illustrated in the drawings) of first communication device 10 or public transportation information received by communicator 11 from outside, for example, from management center 60, and outputs the public transportation information to route searcher 110.

Figure 3:
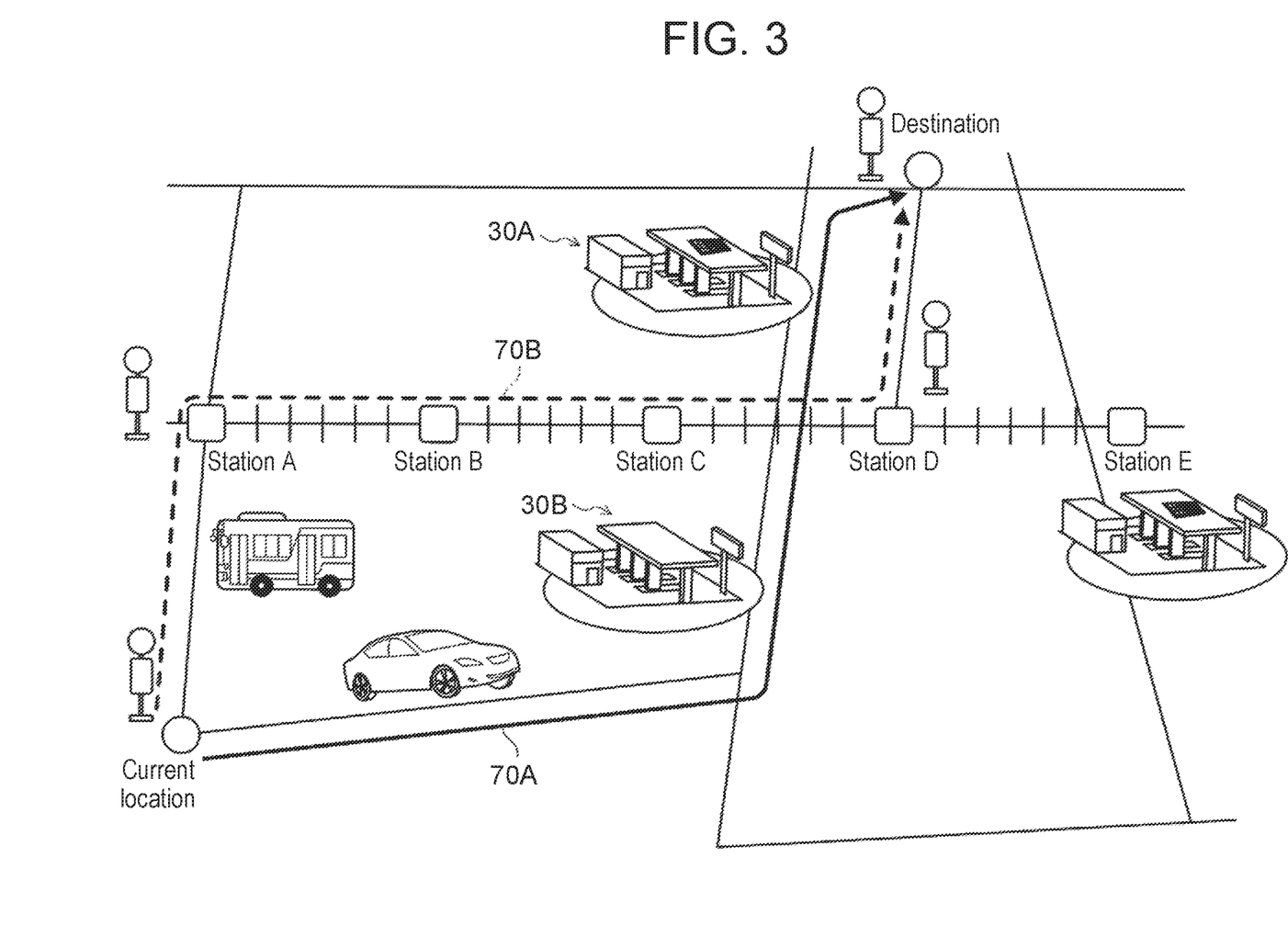
FIG. 3 illustrates a route from a current location to a destination.

As illustrated in FIG. 3, the public transportation information is information, etc., of public transportation available from the current location to the destination. For example, in the case of FIG. 3, a bus is available from the current location to station A and from station D to the destination, and a train is available between station A and station E.

Examples of public transportation include transportation other than first vehicle 20 owned by the user and include a train, a bus, a taxi, and a vehicle for car-sharing (hereinafter referred to as "car-share"), a two-wheeler, a bicycle, traveling on foot, an airplane, and a ship.

Electricity information acquirer 104 acquires electricity information received by communicator 11, and outputs the electricity information to emission level calculator 120 as illustrated in FIG. 2.

Rideshare information acquirer 105 acquires rideshare information received by communicator 11 and outputs the rideshare information to emission level calculator 120 and controller 130.

Map information acquirer 106 acquires map information previously stored in a storage (not illustrated in the drawings) of first communication device 10 or map information received by communicator 11 from outside, for example, from management center 60, and outputs the map information to controller 130. The map information is information of a map of the vicinity of a route from the current location to the destination.

Road searcher 100 searches for first route 70A (refer to FIG. 3) for the user to use first vehicle 20, on the basis of the destination information and the current location information. First route 70A is a route for first vehicle 20 from an origin or a departure point (for example, the current location) to the destination. For example, in the case of FIG. 3, first route 70A is indicated by the solid arrow. Route searcher 110 outputs retrieved first route 70A to emission level calculator 120.

Route searcher 110 searches for second route 70B (refer to FIG. 3) for the user to use transportation other than first vehicle 20, on the basis of the destination information, the current location information, and the public transportation information. Second route 70B is a route for public transportation from the origin to the destination. For example, in the case of FIG. 3, second route 70B is, for example, a route such as that indicated by the dashed arrow in which a bus is used from the current location to station A, a train is used from station A to station D, and a bus is used from station D to the destination. Route searcher 110 outputs retrieved second route 70B to emission level calculator 120.

Emission level calculator 120 calculates a first emission level of carbon dioxide to be caused by first vehicle 20, on the basis of the electricity information and first route 70A. Emission level calculator 120 calculates a second emission level of carbon dioxide to be caused by the transportation, on the basis of second route 70B. Emission level calculator 120 calculates the first emission level and the second emission level with reference to the table illustrated in FIG. 4, for example.

Figure 4:
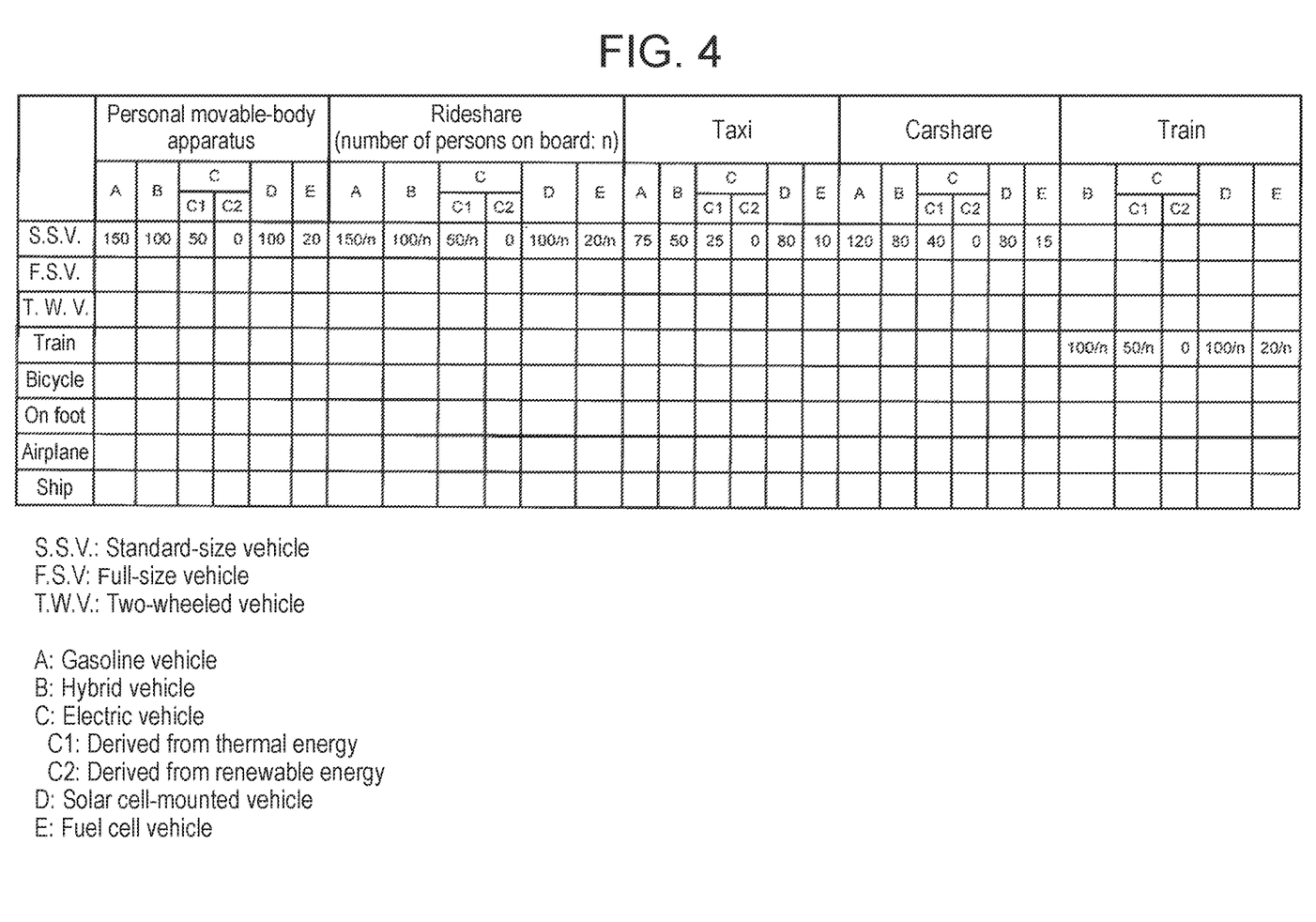
FIG. 4 illustrates an electricity consumption table for calculating a carbon dioxide emission level of each movable-body apparatus.

FIG. 4 illustrates an electricity consumption table for calculating a carbon dioxide emission level of each movable-body apparatus. In FIG. 4, each of the horizontally arranged items indicates the type of transportation which the user can use, and each of the vertically arranged items indicates the vehicle class of each transportation. Note that as the type of transportation, only personal movable-body apparatus, rideshare, taxi, car-share, and train are listed for the sake of convenience. Furthermore, the numerals in FIG. 4 indicate the amount of electricity [kW/km] consumed per one-kilometer drive. In the table illustrated in FIG. 4, the fields other than those associated with the standard-size vehicle and the train are left blank for the sake of convenience, but, in actuality, corresponding numerals are registered.

For example, when the vehicle owned by the user is a standard-size vehicle, emission level calculator 120 refers to the standard-size vehicle section associated with the personal movable-body apparatus in FIG. 4. For example, when the vehicle owned by the user is a gasoline vehicle, emission level calculator 120 uses 150 kW/km to calculate the first emission level.

Note that when the vehicle owned by the user is a vehicle that does not use electricity such as a gasoline vehicle, emission level calculator 120 calculates the first emission level without taking the electricity information into consideration.

Here, when the vehicle owned by the user is an electric vehicle, the amount of electricity that is used in calculation of the first emission level differs depending on the type of the energy source. For example, when the energy source is derived from thermal energy, the amount of electricity is 50 kW/km, and when the energy source is derived from renewable energy, the amount of electricity is 0 kW/km.

When the vehicle owned by the user is an electric vehicle, emission level calculator 120 determines the type of an energy source that has generated the electricity indicated in the acquired electricity information, and calculates the first emission level on the basis of the determined type of the energy source.

The energy source that has generated the electricity stored in the electric vehicle can be determined according to a well-known technique. For example, it is possible to determine the energy source by managing the electricity stored in in-vehicle battery 22, in the storage, etc., of first communication device 10, first vehicle 20, or the like, as disclosed in Japanese Patent No. 5,336,811. The electricity is managed separately for each energy source.

When the electricity indicated in the electricity information is derived from thermal energy, consumption of this electricity results in emission of carbon dioxide substantially corresponding to electricity consumption. The carbon dioxide emission derived from thermal energy is at least 0.5 kg/kWh. In contrast, in the case of electricity generated using renewable energy, no carbon dioxide is emitted upon electricity generation, meaning that consumption of this electricity does not result in emission of carbon dioxide.

In other words, emission level calculator 120 can calculate the first emission level in consideration of the type of the energy source, and thus it is possible to calculate the emission level of carbon dioxide that has been substantially emitted when first vehicle 20 is used.

Furthermore, when rideshare information acquirer 105 acquires the rideshare information and a user and a rideshare participant reach an agreement for rideshare in first vehicle 20, emission level calculator 120 calculates a first emission level of the rideshare. The first emission level of the rideshare is calculated according to the amount of electricity acquired by dividing, by the number of persons on board, the amount of electricity consumed by the personal movable-body apparatus.

For example, when there is one rideshare participant, the number n of persons on board is 2 including the user and the rideshare participant, and when the vehicle owned by the user is a gasoline vehicle, emission level calculator 120 uses, for calculation of the first emission level, 75 kW/km acquired by dividing 150 kW/km by 2 as the amount of electricity.

Thus, the level of carbon dioxide emission per person can be reduced as a result of the use of rideshare; therefore, rideshare can be used as an effective means for curbing carbon dioxide emission.

Furthermore, in the case of calculating the second emission level, for example, when a taxi, car-share, a train, or the like is selected as the transportation, emission level calculator 120 calculates a second emission level with reference to the table in FIG. 4, as with the first emission level. For example, in the case of using a train, when this train is a hybrid vehicle (train), emission level calculator 120 uses, for calculation of the second emission level, the number acquired by diving 100 kW/km by the number n of persons on board as the amount of electricity.

Emission level calculator 120 outputs the calculation results of the first emission level and the second emission level to controller 130.

Controller 130 causes display 140 to display information that prompts a user to curb carbon dioxide emission, on the basis of the first emission level and the second emission level. In other words, display 140 displays information based on the first emission level and the second emission level.

Specifically, controller 130 selects second route 70B as a route to be used by the user when the first emission level is higher than the second emission level, and selects first route 70A as a route to be used by the user when the first emission level is lower than or equal to the second emission level. Subsequently, for example, controller 130 cause display 140 to preferentially display information of the selected route. With this, the user is likely to select a route in which the carbon dioxide emission level is lower; thus, it is possible to prompt the user to curb the on-road carbon dioxide emission. Note that both of the first emission level and the second emission level may simply be displayed.

Furthermore, in the case where the user is attempting to move along first route 70A, when in-vehicle battery 22 needs to be charged, controller 130 acquires map information of the vicinity of first route 70A and determines, on the basis of the map information, whether or not charging station 30A derived from renewable energy is in the vicinity of first route 70A. Note that the vicinity of first route 70A is, for example, a range within a predetermined distance from the first route. The predetermined distance is preferably a predetermined percentage (for example, 1%) of the entire distance of first route 70A, for example.

When determining that charging station 30A is in the vicinity of first route 70A, controller 130 causes display 140 to performs display to prompt the user to charge first vehicle 20 by charging station 30A.

For example, in the case of first route 70A illustrated in FIG. 3, charging station 30B derived from thermal energy and charging station 30A derived from renewable energy are located in first route 70A, and controller 130 causes display 140 to perform display that guides first vehicle 20 to charging station 30A.

With this, regardless of the magnitude relationship between the first emission level and the second emission level, when the user selects first route 70A, charging in-vehicle battery 22 with electricity derived from renewable energy can contribute to curbing future carbon dioxide emission.

Note that the control for determining whether or not there is charging station 30A may be always performed when the first emission level is lower than or equal to the second emission level, or may be performed also when the first emission level is higher than the second emission level.

In the case where the user is to charge first vehicle 20 by charging station 30A, controller 130 performs control to reserve charging station 30A. Specifically, charging station 30A is reserved as a result of communicator 11 of first communication device 10 transmitting charging reservation information for charging station 30A via management center 60.

Furthermore, controller 130 performs control to allow the user to select whether or not to use rideshare. When the user selects to use rideshare, controller 130 determines, on the basis of the rideshare information, whether or not there is a rideshare participant. When determining that there is a rideshare participant and the participant agrees to the rideshare, controller 130 causes display 140 to perform display indicating that first route 70A is to be shown.

By using rideshare in this manner, it is possible to reduce the level of carbon dioxide emission per person. Note that as first route 70A for the rideshare, a route in which the rideshare participant can be boarded on first vehicle 20 is searched for. The control for allowing the user to select whether or not to use rideshare may be performed regardless of the magnitude relationship between the first emission level and the second emission level, or may be performed when the first emission level is higher than the second emission level.

Furthermore, controller 130 may perform control relevant to a payment process, for example, after in-vehicle battery 22 is charged by charging station 30 (30A, 30B) or after travel by the rideshare is completed. This makes it possible to smoothly perform the payment process.

Figure 5:
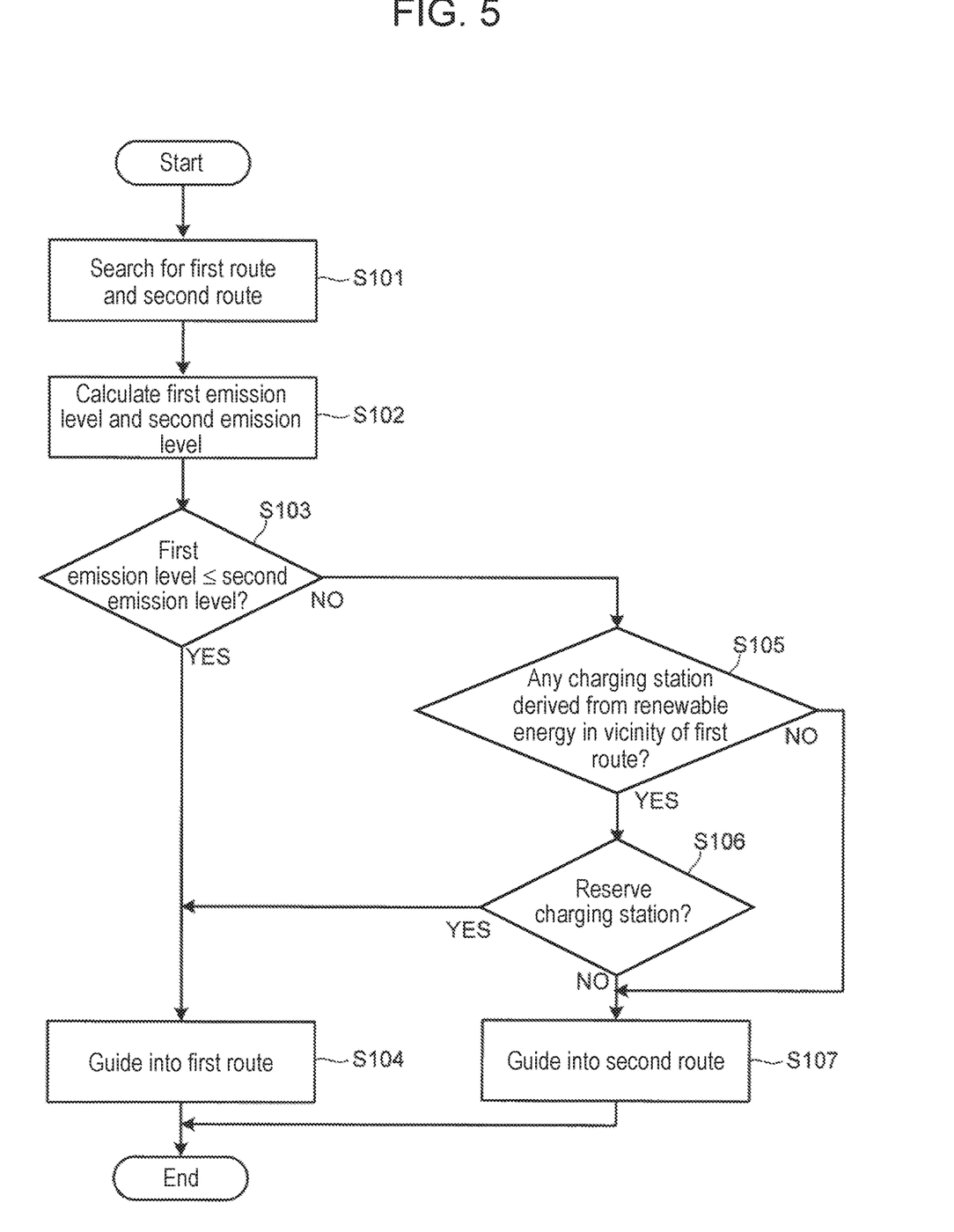
FIG. 5 is a flowchart illustrating an example of a display control operation of the display device illustrated in FIG. 1.

An example of the display control operation of display device 100 configured as described above will be described. FIG. 5 is a flowchart illustrating an example of the display control operation for display device 100. The processing in FIG. 5 includes control in which first vehicle 20 is charged by charging station 30A derived from the renewable energy and is performed, as appropriate, by an operation on first communication device 10 performed by a user.

As illustrated in FIG. 5, route searcher 110 searches for first route 70A and second route 70B (Step S101). Next, emission level calculator 120 calculates the first emission level and the second emission level (Step S102). Next, controller 130 compares the first emission level and the second emission level. Subsequently, controller 130 determines whether or not the first emission level is lower than or equal to the second emission level (Step S103).

As a result of the determination, when the first emission level is lower than or equal to the second emission level (YES in Step S103), controller 130 causes display 140 to display an indication in which first route 70A is to be guided into (Step S104). On the other hand, when the first emission level is higher than the second emission level (NO in Step S103), controller 130 determines whether or not there is charging station 30A in the vicinity of first route 70A (Step S105).

As a result of the determination, when there is no charging station 30A in the vicinity of first route 70A (NO in Step S105), the processing transitions to Step S107. On the other hand, when there is charging station 30A in the vicinity of first route 70A (YES in Step S105), controller 130 determines, on the basis of instruction from the user, whether or not to perform control to reserve charging station 30A (Step S106).

As a result of the determination, in the case of reserving charging station 30A (YES in Step S106), the processing proceeds to Step S104. First route 70A in this case goes through reserved charging station 30A.

On the other hand, in the case of not reserving charging station 30A (NO in Step S106), controller 130 causes display 140 to display an indication in which second route 70B is to be guided into (Step S107). After Step S104 and Step 107, the present control ends.

Note that in the flowchart illustrated in FIG. 5, only two routes, namely, first route 70A and second route 70B, are searched for, but three or more routes may be searched for. In this case, regarding the process in Step S103, for example, the first emission level and the second emission level in the route in which an emission level becomes lowest among the retrieved routes may be used in the process in Step S103.

Figure 6:
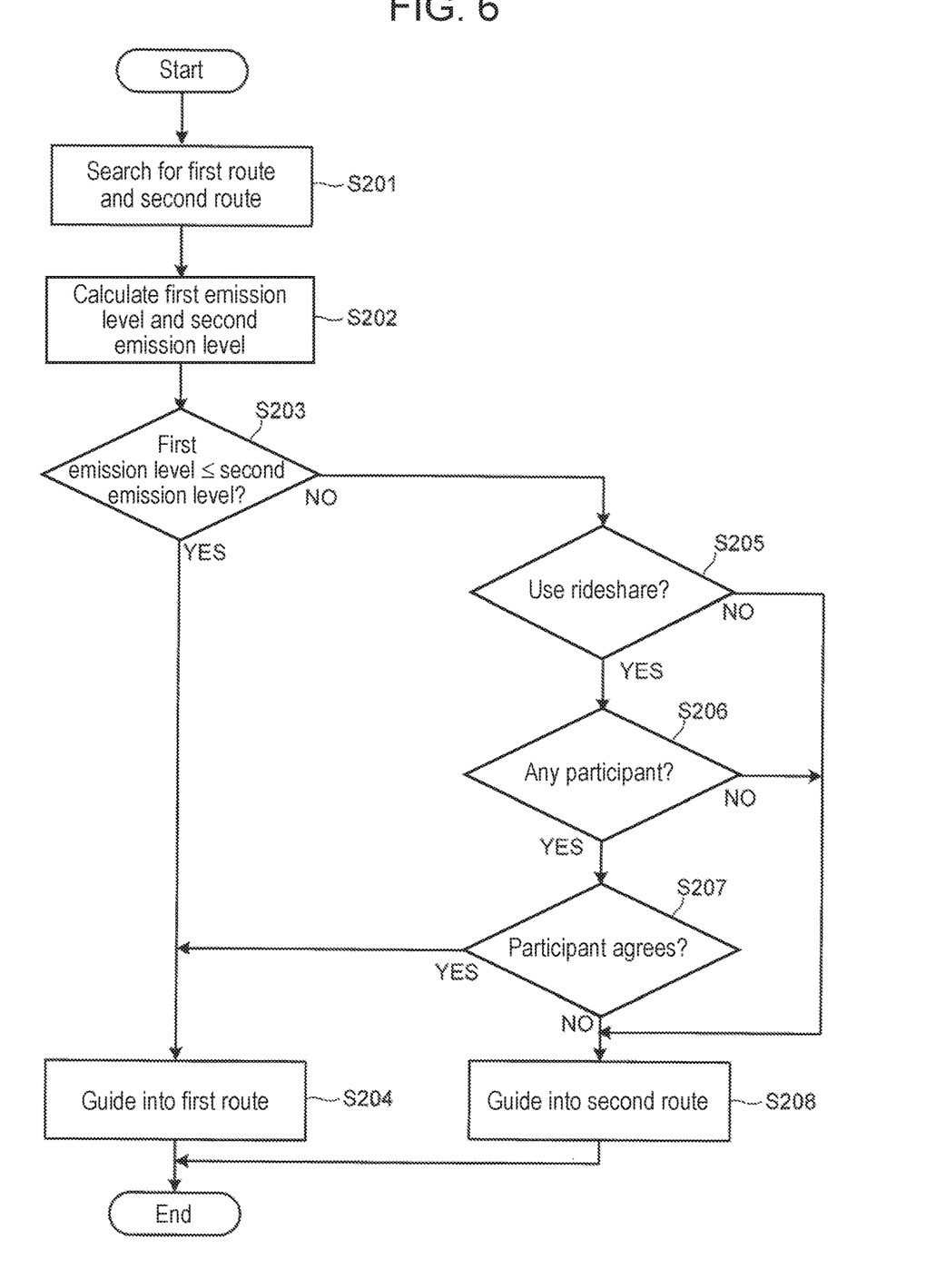
FIG. 6 is a flowchart illustrating another example of a display control operation of the display device illustrated in FIG. 1.

Next, display control including rideshare in processing will be described. FIG. 6 is a flowchart illustrating an example of the display control operation for display device 100. The processing in FIG. 6 is performed, as appropriate, by an operation on first communication device 10 performed by a user.

As illustrated in FIG. 6, route searcher 110 searches for first route 70A and second route 70B illustrated in FIG. 3 (Step S201). Next, emission level calculator 120 calculates the first emission level and the second emission level (Step S202). Subsequently, controller 130 determines whether or not the first emission level is lower than or equal to the second emission level (Step S203).

As a result of the determination, when the first emission level is lower than or equal to the second emission level (YES in Step S203), controller 130 causes display 140 to display an indication in which first route 70A is to be guided into (Step S204). On the other hand, when the first emission level is higher than the second emission level (NO in Step S203), controller 130 determines whether or not the user is to use rideshare (Step S205). Whether or not the user is to use rideshare is, for example, based on information set by the user.

As a result of the determination, when no rideshare is to be used (NO in Step S205), the processing transitions to Step S208. On the other hand, when the rideshare is to be used (YES in Step S205), controller 130 determines whether or not there is a rideshare participant (Step S206).

As a result of the determination, when there is no rideshare participant (NO in Step S206), the processing transitions to Step S208. On the other hand, when there is a rideshare participant (YES in Step S206), controller 130 determines whether or not the participant agrees to the rideshare in first vehicle 20 (Step S207).

As a result of the determination, when the participant agrees to the rideshare in first vehicle 20 (YES in Step S207), the processing transitions to Step S204. On the other hand, when the participant does not agree to the rideshare in first vehicle 20 (NO in Step S207), controller 103 causes display 140 to display an indication in which second route 70B is to be guided into (Step S208). After Step S204 and Step 208, the present control ends.

As described above, according to the present embodiment, the carbon dioxide emission levels in first route 70A and second route 70B are compared, and one of the routes in which the carbon dioxide emission level is lower is selected and displayed on display 140. As a result, the user is likely to select a route in which the carbon dioxide emission level is lower; thus, it is possible to prompt the user to curb the on-road carbon dioxide emission.

Furthermore, when first vehicle 20 is an electric vehicle, it is possible to identify the type of an energy source that has generated the electricity stored in in-vehicle battery 22 of first vehicle 20. Therefore, in the case where in-vehicle battery 22 has been charged with electricity derived from renewable energy, the first emission level is low. Accordingly, the first emission level is likely to be lower than or equal to the second emission level; thus, it is possible to more accurately increase the likelihood of selecting a route in which the carbon dioxide emission level is low.

Furthermore, when there is charging station 30A derived from renewable energy in the vicinity of first route 70A, charging by charging station 30A is prompted, and thus it is possible to contribute to curbing future carbon dioxide emission.

Furthermore, since a user is allowed to select whether or not to use rideshare, it is possible to reduce the level of carbon dioxide emission per person through the use of rideshare.

Note that display device 100 is provided in first communication device 10 in the above embodiment, but the present disclosure is not limited thereto; display device 100 may be provided in first vehicle 20. When the first emission level is higher than the second emission level, it is sufficient that the prompt for use of rideshare or the prompt for use of charging station 30 derived from renewable energy be provided more intensively.

Display device 100 is configured to include route searcher 110 in the above embodiment, but the present disclosure is not limited thereto; display device 100 may be configured to receive route search information from outside.

Note that emission level calculator 120 and controller 130 can constitute a control device. Also in this case, controller 130 compares the first emission level and the second emission level. In this case, display device 100 may include display 140 only, and the control device including emission level calculator 120 and controller 130 may be separated from display device 100.

The exemplary embodiment according to the present disclosure has been described in detail above with reference to the drawings; the functions of the devices described above can be implemented using a computer program.

A computer that executes the program to implement the functions of the devices described above includes an input device, an output device, a central processing unit (CPU), a read-only memory (ROM), a random-access memory (RAM), a storage device, a reading device, a network card, and the like, which are connected by a bus. Examples of the input device include a keyboard, a mouse, a touchpad, and the like. Examples of the output device include a display, a loudspeaker, and the like. Examples of the storage device include a hard disk device, a solid-state drive (SSD), and the like. The reading device reads information from recording media such as a digital versatile disk read-only memory (DVD-ROM) and a universal serial bus (USB) memory. The network card performs communication via a network.

The reading device reads a program for implementing the functions of the devices described above, from a recording medium having the program recorded thereon, and causes the storage device to store the program. Alternatively, the network card communicates with a server device connected to the network, and causes the storage device to store a program for implementing the functions of the devices described above that has been downloaded from the server device.

The CPU copies the program stored in the storage device to the RAM, sequentially reads commands included in the program from the RAM, and executes the commands; thus, the functions of the devices described above are implemented.

Aside from this, the above exemplary embodiment is merely specific exemplification for implementing the present disclosure, and with the above exemplary embodiment, the technical scope of the present disclosure should not be construed as limiting. In other words, the present disclosure can be implemented in various forms without departing from the spirit and principles thereof.

The display device according to the present disclosure is useful as a display device and a display method by which a user can be prompted to curb the on-road carbon dioxide emission.

What is claimed is:

1. A display device comprising:
an emission level calculator configured to:
   calculate, based on a first route for a vehicle from an origin to a destination and electricity information of electricity stored in an in-vehicle battery in which electricity to be used for travel of the vehicle is stored, a first emission level of carbon dioxide to be caused by travel of the vehicle on the first route; and
   calculate, based on a second route for public transportation from the origin to the destination, a second emission level of carbon dioxide attributable to be caused by travel of the public transportation on the second route;
a display configured to display information based on the first emission level and the second emission level; and
a controller configured to:
   acquire map information of a vicinity of the first route, and determine based on the map information whether a charger that supplies electricity derived from renewable energy generated with carbon dioxide emission less than 0.5 kg/kWh is in the vicinity of the first route; and
   upon determining that the charger is in the vicinity of the first route, cause the display to display information that provides a user prompt to charge the in-vehicle battery with the charger that supplies the electricity derived from the renewable energy.

2. The display device according to claim 1,
wherein the electricity information includes a type of an energy source that has generated the electricity stored in the in-vehicle battery, and
the emission level calculator is configured to calculate the first emission level further based on the type of the energy source.

3. The display device according to claim 1,
wherein the controller is configured to start a charger reservation process upon receiving information indicating that the charger is to be reserved.

4. The display device according to claim 3,
wherein the controller is configured to start a payment process after the in-vehicle battery is charged.

5. The display device according to claim 1,
wherein the controller is configured to:
   receive information indicating whether a rideshare is to be used, the rideshare being sharing of a vehicle journey;
   upon determining that the rideshare is to be used, acquire rideshare information indicating that a participant of the rideshare wishes to use the rideshare; and
   select the first route as a route to be used, based on the rideshare information.

6. The display device according to claim 5,
wherein the controller is configured to start a payment process after the rideshare is used.

7. The display device according to claim 1, further comprising a route searcher configured to search for the first route and the second route.

8. The display device according to claim 1, wherein the controller is configured to determine whether a charger that supplies electricity derived from renewable energy generated with no carbon dioxide emission is in the vicinity of the first route.

9. A display method comprising:
calculating, based on a first route for a vehicle from an origin to a destination and electricity information of electricity stored in an in-vehicle battery in which electricity to be used for travel of the vehicle is stored, a first emission level of carbon dioxide to be caused by travel of the vehicle on the first route;
calculating, based on a second route for public transportation from the origin to the destination, a second emission level of carbon dioxide to be caused by travel of the public transportation on the second route;
displaying information based on the first emission level and the second emission level;
acquiring map information of a vicinity of the first route;
determining based on the map information whether a charger that supplies electricity derived from renewable energy generated with carbon dioxide emission less than 0.5 kg/kWh is in the vicinity of the first route; and
upon determining that the charger is in the vicinity of the first route, displaying information that provides a user prompt to charge the in-vehicle battery with the charger that supplies the electricity derived from the renewable energy.

10. The display method according to claim 9, wherein the determining includes determining whether a charger that supplies electricity derived from renewable energy generated with no carbon dioxide emission is in the vicinity of the first route.

11. A display method for a display device mounted in a vehicle with an in-vehicle battery, the method comprising:
acquiring map information of a vicinity of a route for the vehicle;
determining based on the map information whether a charger that supplies electricity derived from renewable energy generated with carbon dioxide emission less than 0.5 kg/kWh is in the vicinity of the route; and
upon determining that charger is in the vicinity of the route, displaying on the display device information that provides a user prompt to charge the in-vehicle battery with the charger is in the vicinity of the route.

12. The display method according to claim 11, wherein the determining includes determining whether a charger that supplies electricity derived from renewable energy generated with no carbon dioxide emission is in the vicinity of the first route.

13. The display method according to claim 11, further comprising:
upon determining that the charger is to be reserved, starting a charger reservation process that reserves the charger.

14. The display method according to claim 11, further comprising:
starting a payment process after the in-vehicle battery is charged.

* * * * *